United States Patent [19]

Friedman et al.

[11] 4,253,757
[45] Mar. 3, 1981

[54] SPREAD ROLLER ASSEMBLY

[75] Inventors: Harvey S. Friedman, Sudbury; Leon Rubinstein, Natick, both of Mass.

[73] Assignee: Polaroid Corporation, Cambridge, Mass.

[21] Appl. No.: 80,407

[22] Filed: Oct. 1, 1979

[51] Int. Cl.³ .............................................. G03D 9/02
[52] U.S. Cl. .................................................. 354/304
[58] Field of Search ..................... 354/85, 86, 87, 304, 354/301

[56] References Cited

U.S. PATENT DOCUMENTS

| 2,794,378 | 6/1957 | Wareham | 354/87 |
| 3,165,039 | 1/1965 | Downey | 354/304 |
| 3,327,599 | 6/1967 | Murphy | 354/301 |
| 3,335,652 | 8/1967 | Erikson | 354/304 |
| 3,364,834 | 1/1968 | Erikson | 354/304 |
| 3,561,340 | 2/1971 | Erlichman | 354/304 |
| 3,745,904 | 7/1973 | Bing et al. | 354/304 |
| 3,882,518 | 5/1975 | Douglas | 354/86 |
| 3,974,510 | 8/1976 | Ivester | 354/304 |
| 3,999,202 | 12/1976 | Goto | 354/304 |
| 4,000,500 | 12/1976 | Ivester | 354/83 |
| 4,078,241 | 3/1978 | Paglia | 354/86 |
| 4,087,831 | 5/1978 | Bendoni | 354/86 |
| 4,134,655 | 1/1979 | Friedman | 354/86 |

*Primary Examiner*—L. T. Hix
*Assistant Examiner*—Alan Mathews
*Attorney, Agent, or Firm*—Alfred E. Corrigan

[57] ABSTRACT

A spread roller assembly including a housing and a pair of juxtaposed rollers for spreading a processing liquid across a layer of an exposed film unit so as to initiate the formation of a visible image therein. The ends of one of the rollers are mounted in a pair of movable bearings for enabling the roller to move toward and away from the other roller. Each of the movable bearings includes a film engaging member which moves into engagement with a trailing end of a film unit, as the latter moves out of engagement with the rollers, so as to releasably retain the film unit in engagement with a wall of the housing. A unique spring arrangement is provided which applies substantially all of its forces in a direction perpendicular to the axes of the rollers thereby substantially eliminating any adverse side forces being applied to the assembly. The support members for the rollers are adapted to be snap fitted to the housing.

9 Claims, 8 Drawing Figures

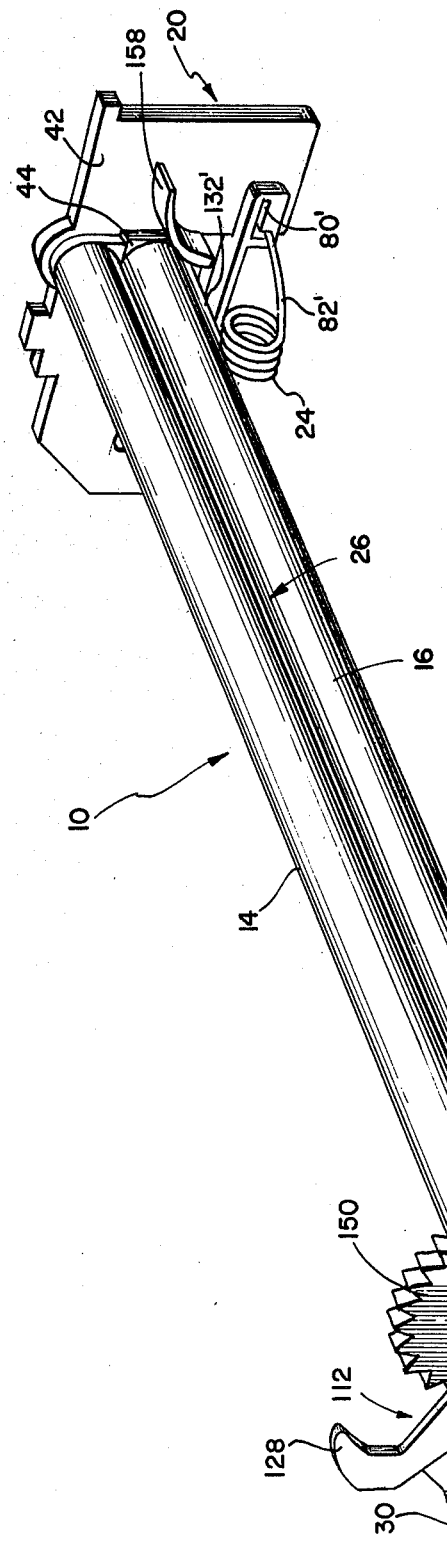
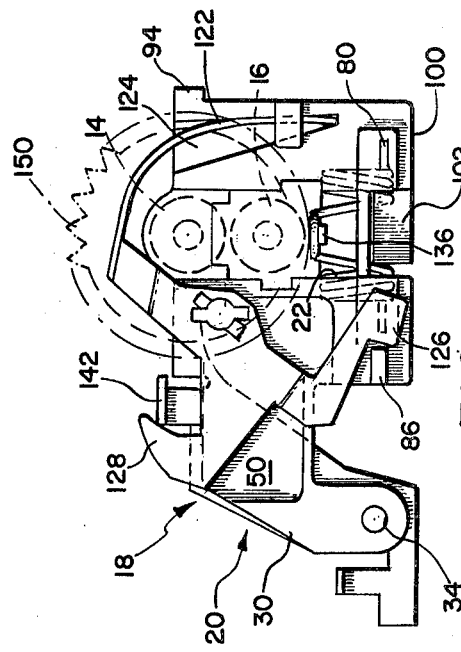

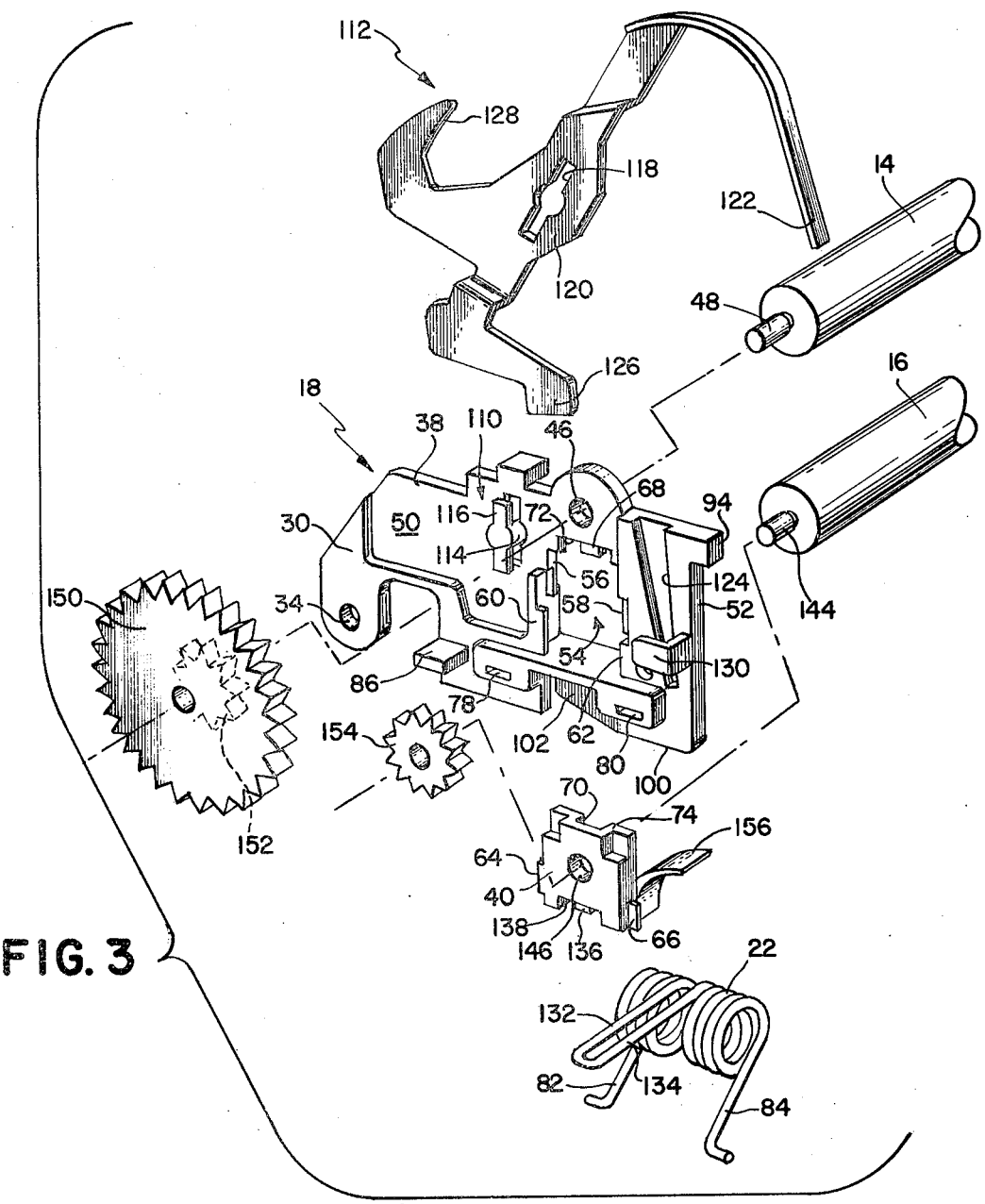
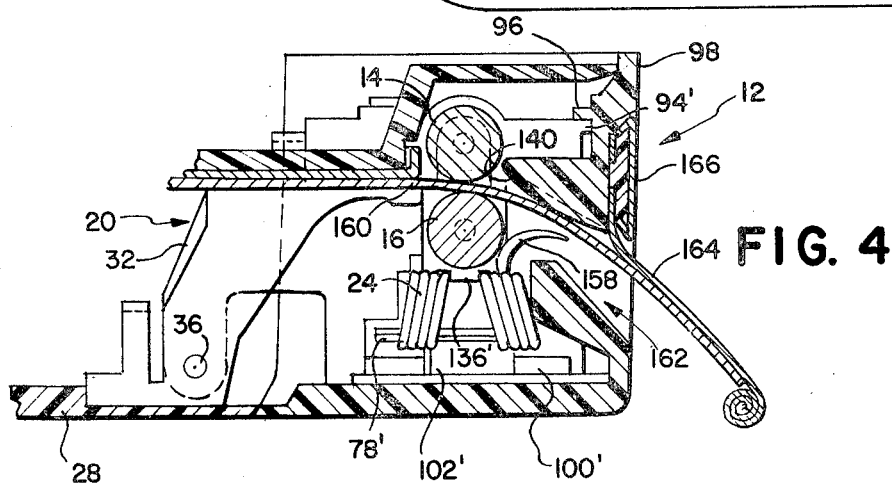
FIG. 3
FIG. 4

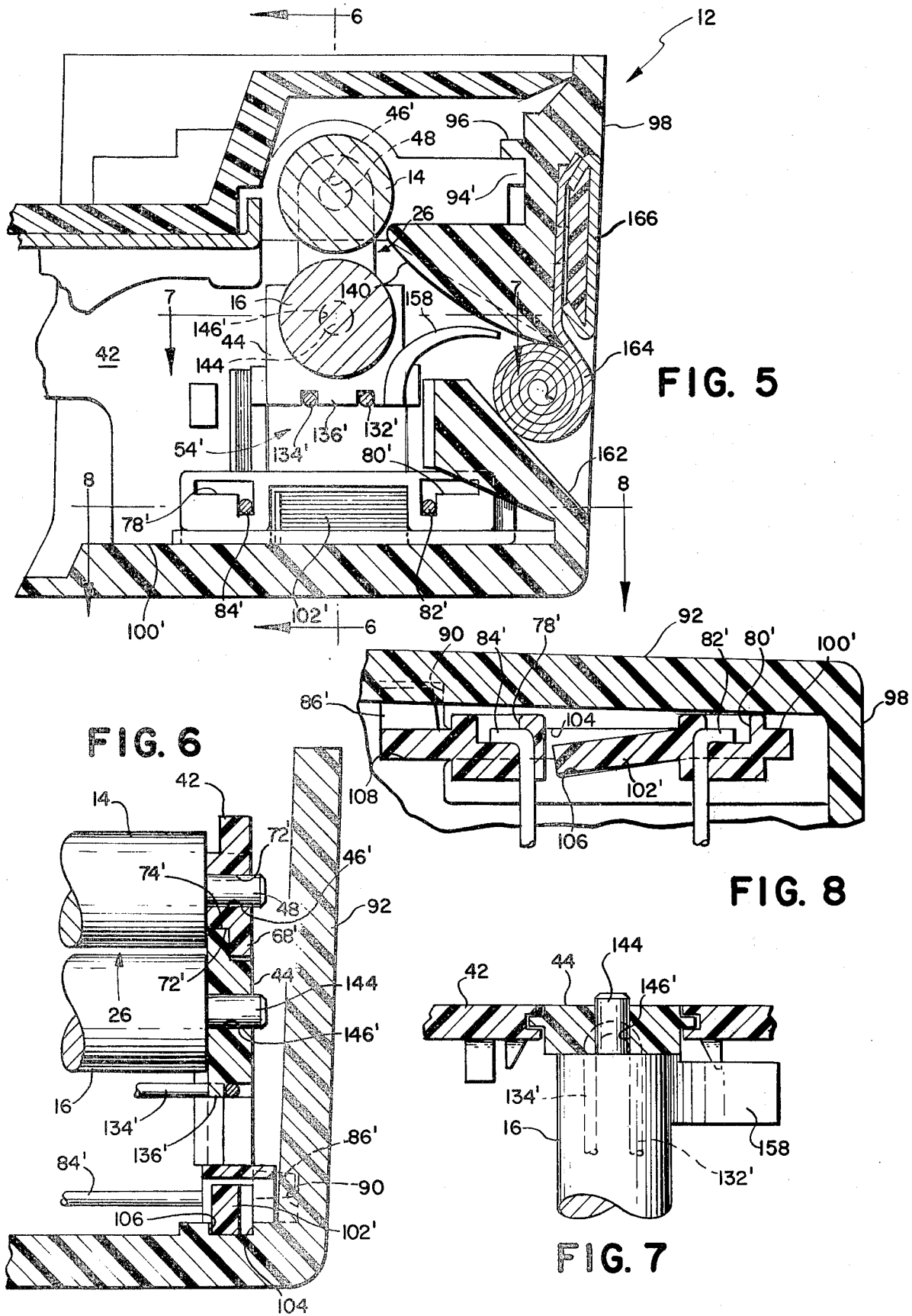

SPREAD ROLLER ASSEMBLY

BACKGROUND OF THE INVENTION

1. Field of the Invention

This invention relates to a spread roller assembly including a pair of juxtaposed rollers for spreading a processing liquid across a layer of an exposed film unit so as to initiate the formation of a visible image therein.

2. Description of the Prior Art

Spread roller assemblies for use with cameras of the self-developing or instant type are generally well known. A common type of such an assembly includes a pair of juxtaposed elongate rollers which may be manually driven by pulling an exposed film unit through the rollers or they may be powered by a motor mounted within the camera. Examples of the former may be found in U.S. Pat. Nos. 3,745,904, 3,327,599 and 2,794,378 while examples of the latter may be found in U.S. Pat. Nos. 4,134,655, 4,087,831 and 4,078,241. Often, the rollers are rotatably supported by individual bearing blocks located at each side of a spread roller housing and a biasing means including at least one spring is provided for resiliently biasing one of the rollers toward the other, as described in the aforementioned U.S. Pat. Nos. 3,745,904 and 3,327,599.

The biasing arrangements used in U.S. Pat. Nos. 3,745,904 and 3,327,599 are capable of exerting side forces on the respective spread roller assemblies, i.e., forces which are not substantially perpendicular to the axes of the rollers. Such side forces may change the substantially parallel relation between the rollers and adversely affect the spreading of a processing liquid across a layer of an exposed film unit. Further, the biasing arrangement disclosed in U.S. Pat. No. 3,745,904 unnecessarily increases the amount of power required to rotate the roller because the ends of the springs are in direct engagement with the journals of one of the rollers.

It is also well known to construct spread roller assemblies of the type described such that they may be operatively attached to their housings without the use of screws, rivets or other conventional means. Such assemblies may be classified as being of the snap-in type, e.g., see U.S. Pat. No. 3,974,510 and the aforementioned U.S. Pat. No. 3,745,904. While this type of snap-in assembly works well, it does have its disadvantages. For example, the structure for supporting the rollers is usually of a unitary construction and if a portion of the structure is out of specification then the entire structure has to be replaced. Further, this structure often takes the form of a U-shaped bracket wherein the biasing means exerts forces on the base and legs of the U thereby giving rise to the possibility that the spring may exert side forces on the legs, as mentioned hereinbefore.

In combination with spread roller assemblies of the above type, it has been found beneficial to provide the camera with means for releasably retaining the exposed film unit after it has been ejected by the spread rollers. Such a means is shown in the aforementioned U.S. Pat. No. 4,134,655 in the form of a pair of laterally spaced clips which cooperate with a wall of the camera for grasping an exposed film unit by its trailing end after it has moved out of engagement with the spread rollers. However, since these clips are in frictional engagement with the film unit throughout most of the time that it is passing through the rollers they create at least two problems. Specifically, these clips increase the forced required for the rollers to advance the film unit toward the exterior of the camera. Also, if the stiffness of these clips exceeds a certain point, they may cause the advancing film unit to buckle at a point betweem their engagement with the film unit and the bite of the spread rollers thereby possibly adversely affecting the spread of the processing liquid.

SUMMARY OF THE INVENTION

The instant invention relates to a spread roller assembly for use with a camera of the instant or self-developing type. The assembly includes a pair of support members which are adapted to be snap fitted to lateral sides of a spread roller housing. Each of the support members includes a fixed bearing for rotatably supporting an end of a first elongate roller, a section for receiving and guiding a movable bearing toward and away from the fixed bearing, said movable bearing being adapted to rotatably receive an end of a second elongate roller, and a pair of recesses for receiving the opposite ends of a balanced torsion spring. Each of the movable bearings include a projection which is adapted to receive an intermediate portion of one of the springs. When the movable bearings are slidably attached to the support members and the springs are attached to their respective support members and movable bearings, the springs provide a force which resiliently biases the second roller toward the first roller. Also, since the springs are attached to only the support members and the movable bearings, which in turn are located in substantially parallel planes which are perpendicular to the axes of the rollers, all of the spring forces are substantially perpendicular to said axes.

The spread roller assembly is also provided with means for engaging a film unit after it has moved out of engagement with the rollers, which means, in cooperation with a wall of the spread roller housing, releasably grasps the film unit by its trailing end while its opposite leading end protrudes through an exit slot in the housing. The engaging means is an integral portion of each movable bearing and they are originally located closely adjacent to the wall such that the maximum spacing between the engaging means and the wall is less than the thickness of a film unit as it moves out of engagement with the rollers. As an exposed film unit enters the bite of the rollers, its thickness causes the second elongate roller and its movable bearings to move away from the first elongate roller thereby moving the film engaging means to a position out of the path of travel that the exposed film unit will take as it emerges from between the rollers. When the trailing end of the exposed film unit moves out of engagement with the rollers, the springs return the second elongate roller and its movable bearings to their original positions. As the movable bearings approach their original positions, the film engaging means move into engagement with the sides of the film unit and press it further into engagement with the wall thereby releasably retaining the film unit in place until the operator of the camera has time to remove it.

As mentioned previously, the support members are adapted to be snap fitted to the spread roller housing. This is accomplished by providing each support member with a longitudinally extending rail which includes a non-aligned resilient portion which is adapted to be cammed into alignment with the rest of the rail as the latter is being slidably received by one of a pair of grooves located in a bottom wall of the spread roller housing. Each of the grooves includes an enlarged section which is adapted to receive the resilient portion of the rail for locking the support member in place. The housing also includes other structure which cooperates with the support members for precluding movement of the latter once they are properly located by the rails and grooves.

An object of the invention is to provide photographic apparatus, including a spread roller housing having a pair of juxtaposed elongate rollers mounted thereon for spreading a processing liquid across a layer of an exposed film unit, with means which is movable into engagement with an exposed film unit as it moves out of engagement with the rollers for releasably retaining it in contact with a wall of the housing.

Another object of the invention is to provide photographic apparatus of the type described with a spring biasing arrangement which applies substantialy all of its forces in a direction perpendicular to the axis of one of the elongate rollers.

Still another object of the invention is to provide photographic apparatus of the type described with means for readily attaching a pair of spread roller support members to opposite sides of the spread roller housing without the use of conventional fasteners.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an enlarged perspective view of the spread roller assembly of the instant invention shown outside of its housing;

FIG. 2 is a side elevational view of one side of the spread roller assembly of FIG. 1 with parts shown in phantom lines for reasons of clarity;

FIG. 3 is an exploded perspective view of a portion of a spread roller assembly;

FIG. 4 is a cross-sectional side elevational view of the spread roller assembly mounted in its housing and showing an exposed film unit passing through the gap of a pair of rollers;

FIG. 5 is an enlarged cross-sectional view similar to FIG. 4;

FIG. 6 is a frontal view of a portion of the spread roller assembly taken generally along the line 6—6 of FIG. 5;

FIG. 7 is a plan view of a portion of the spread roller assembly taken generally along the line 7—7 in FIG. 5; and FIG. 8 is a plan view of a portion of the spread roller assembly taken generally along the line 8—8 of FIG. 5.

DETAILED DESCRIPTION OF THE INVENTION

Reference is now made to the drawings and particularly to FIG. 1 wherein is shown photographic apparatus in the form of a spread roller assembly 10 absent its housing. The assembly 10 includes a housing 12 (see FIG. 5), first and second elongate rollers 14 and 16, support means 18 and 20 mounted adjacent opposite sides of the housing 12, and means 22 and 24 in the form of balanced torsion springs for resiliently biasing the second elongate roller 16 toward the first elongate roller 14 such that they define a pressure generating gap 26 (see FIGS. 5 and 6 especially) having a predetermined minimum depth. The assembly 10 is adapted to be pivotally coupled to an end of a film chamber of a camera, a portion of which is shown at 28 in FIG. 4, by a pair of arms 30 and 32 extending from the support means 18 and 20, respectively, which arms include apertures 34 and 36 for pivotally receiving a pair of pins, much in the manner shown in U.S. Pat. No. 4,000,500.

The support means 18 includes a support member 38 and a movable bearing 40. The support means 20 includes a support member 42 and a movable bearing 44 which is a substantialy mirror image of the movable bearing 40. As such, the support means 18 and 20 are similar to the legs of the U-shaped spread roller bracket shown in U.S. Pat. No. 4,078,241.

The support member 38 includes a fixed bearing in the form of an aperture 46 for rotatably receiving one of the journals 48 of the roller 14. As best seen in FIG. 3, the aperture 46 extends from an outwardly facing wall 50 to an inwardly facing wall 52. Also extending through the support member 38 is a second, substantially rectangularly shaped aperture 54 for slidably receiving the movable bearing 40. A pair of flanges 56 and 58 extend from the wall 52 inwardly toward each other and cooperate with a second pair of flanges 60 and 62 for capturing a pair of tabs 64 and 66 extending outwardly from each side of the movable bearing 40. A guide 68 extends downwardly from the wall 52 into the aperture 54 and is adapted to be received in a channel 70 in the movable bearing 40. An uppermost end 72 of the aperture 54 cooperates with the uppermost end 74 of the movable bearing 40 to limit the movement of the second roller 16 toward the first roller 14 thereby maintaining a gap 26 having a predetermined depth. A boss 76 extends outwardly from the wall 50. A pair of apertures 78 and 80 extend completely through the boss 76 and through the inwardly facing wall 52 of the support member 38. The apertures 78 and 80 are adapted to receive the ends 82 and 84 of the spring 22. Also extending outwardly from the wall 50 is a flange 86 which is adapted to be slidably received by a slot 90 located in each of the side walls 92 of the spread roller housing 12 to prevent movement of the support member 38 in a vertical direction. Vertical stability is further enhanced by a forwardly extending flange 94 which is adapted to be located below a laterally extending rib 96 located on a forward wall 98 of the housing 12, said rib 96 running substantially the entire distance between the side walls 92.

The support member 38 (as well as member 40) is adapted to be snap fitted to the housing 12. Specifically, the support member 38 includes a longitudinally extending rail 100 at its lower edge. The rail 100 includes an inwardly extending, cantilevered, resilient portion 102. At this time it should be noted that the support member 42 is substantially identical to the support member 38, as described up to this point, and the reference characters for the corresponding elements or parts of the former have been primed accordingly. The rails 100 and 100' are adapted to be slidably received by a pair of laterally spaced, longitudinally extending grooves (only one being shown) 104, each of which includes an enlarged section 106 located intermediate its ends. As best shown in FIGS. 6 and 8, the support member 42 is snap fitted or fixedly attached to the housing 12 by aligning the right hand end of the rail 100' (as viewed in FIG. 8) with the left hand open end of the groove 104 and sliding the support member 42 toward the forward wall 98 of the housing 12. Also, as best seen in FIG. 8, the rail 100' has a width or transverse measurement which is substantially equal to the width of the groove 104 sans the enlarged section 106. As this movement is continued, a wall 108 of the groove 104 cams the resilient portion 102' into alignment with the remainder of the rail 100'. Forward movement of the support movement is continued until the resilient portion 102' is located in alignment with the enlarged section 106 whereupon its resiliency snaps the portion 102' into the enlarged section 106 thereby locking the latter to the housing 12. At this time the flange 86' is located within the slot 90 in the side wall 92 and the flange 94' is located below the rib 96 and in close adjacency to the forward wall 98 of the housing 12 and between the end of a film unit deflecting surface 140 and the side wall 92 thereby stabilizing the support member 42 about three orthogonal axes. The support member 38 is attached to the housing 12 in a similar manner.

The support member 38 differs from the support member 42 in that a latch retainer 110 extends outwardly from the wall 50 for pivotally receiving a latch 112. The retainer 110 includes a cylindrical section 114 and a flange 116 which present a planar configuration similar to that of a slot 118 located in the latch such that the slot 118 may be aligned with the retainer 110 and pressed on to the retainer 110 to thereby locate a surface 120 of the latch in a plane located between the flange 116 and the wall 50. The latch 112 is then rotated clockwise to misalign the opening 118 with the flange 116 and to introduce a resilient extension 122 into a groove 124 located in the wall 50. Rotation of the latch 112 is stopped when its leg 126 engages the flange 86. So positioned, the extension 122 resiliently biases the latch in a clockwise direction to maintain its latching arm 128 in engagement with a stationary latching member 142 mounted in the camera, as shown more fully in FIG. 2. It is to be noted that when the latch 112 is rotated in a counterclockwise direction to free the housing 12 for rotation in a clockwise direction, the latch 112 is never rotated through a distance sufficient to realign the slot 118 with the flange 116. A flange 130 is provided for retaining the extension 122 within the groove 124.

As mentioned hereinbefore, the spring 22 includes opposite ends 82 and 84 which are adapted to be received by the apertures 78 and 80 which extend completely through the support member 38. The spring 22 also includes an intermediate section where two sections 132 and 134 are bent in opposite directions to form a bight for anchoring the intermediate section of the spring 22 to a protuberance 136 extending downwardly from a recess 138 in the movable bearing 40. The spring 24 and the movable bearing 44 are substantially identical to the spring 22 and the bearing 40 and therefore their corresponding parts have the same reference numerals in addition to a prime.

When the support means 18 and 20 are assembled as shown in FIGS. 1, 2 and 5-8 with the journals 48 of the first roller 14 located in the apertures 46 and 46' of the support members 38 and 42 and the journals 144 of the roller 16 located in the apertures 146 and 146' in the movable bearings 40 and 44, the springs 22 and 24 apply resilient forces to the support members 38 and 42 and their respective movable bearings 40 and 44 which move the roller 16 toward the roller 14 until the surfaces 74 and 74' engage the surfaces 72 and 72', respectively, to thereby establish a minimum gap 26 between the rollers 14 and 16. While the use of this type of springs for this purpose is old, as evidenced by U.S. Pat. No. 2,794,378, the present arrangement is unique in that substantially all of the forces applied by the springs 22 and 24 to their respective support members and movable bearings are substantially in the planes containing the support members and are therefore perpendicular to the longitudinal axes of the rollers 14 and 16.

The rollers 14 and 16 are adapted to be driven by a motor and gear train (not shown) which drives a compound gear 150 fixedly attached to one of the journals 48 of the roller 14. The compound gear 150 includes a smaller diameter gear 152 which is in mesh with a gear 154 fixedly attached to a journal 144 of the roller 16. Alternatively, the compound gear 150 could be replaced by a manually operable crank which would be coupled to a gear mounted on the journal 48 of the roller 14.

Each of the movable bearings 40 and 44 is provided with an inwardly extending, forwardly curving film engaging means 156 and 158, respectively. When a film unit 160 is not located between the rollers 14 and 16, the film engaging means 156 and 158 are located closely adjacent the film deflecting surface 140. The surface 140 is contoured so as to initially guide a film unit 160 along a predetermined path of travel as it emerges from between the rollers 14 and 16, as best seen in FIG. 4.

After the film unit 160 has been exposed, it is moved into the gap 26 between the rollers 14 and 16. The drive to the rollers 14 and 16 continues the advancement of the film unit therebetween. Since the thickness of the film unit is greater than the depth of the gap 26, the roller 16 and its movable bearings 40 and 44 are moved away from the roller 14 thereby removing the film engaging means from the path of travel that the film unit 160 will take as it emerges from between the rollers 14 and 16, as best illustrated in FIG. 4. The rollers 14 and 16 continue the advancement of the exposed film unit toward an exit slot 162 in the forward wall 98 while simultaneously spreading a processing liquid across a layer of the exposed film unit 160 so as to initiate the formation of a visible image within the film unit. As the exposed film unit emerges from the housing 12 via the slot 162, it engages and uncoils a sheet 164 of a resilient and opaque material. The sheet 164 is initially mounted in lighttight relation with the slot 162 by a retainer clip 166. When the trailing end of the exposed film unit 160 moves out of engagement with the rollers 14 and 16, the springs 22 and 24 return the roller 16 to its original position (see FIG. 5) thereby moving the film engaging means 156 and 158 into engagement with the lateral sides of the underside of the film unit 160. Since the original spacing between each of the film engaging means 156 and 158 and the film deflecting surface 140 is less than the thickness of the film unit, the means 156 and 158 press the upper surface of the film unit into more intimate contact with the surface 150 to thereby releasably retain the film unit 160 in place with its leading end located exteriorly of the housing 12.

Since certain changes may be made in the above apparatus without departing from the scope of the invention herein involved, it is intended that all matter contained in the above description or shown in the accompanying drawings shall be interpreted as illustrative and not in a limiting sense. For example, while the instant invention has been described with reference to a spread roller assembly in which the axes of the rollers are generally parallel, it should be understood that the invention is also applicable to one wherein their axes are offset relative to each other.

What is claimed is:

1. Photographic apparatus comprising:
   a housing including means for defining a passageway leading to the exterior of said housing;
   first and second elongate rollers adapted to spread a processing liquid across a layer of an exposed film unit, as it moves therebetween, so as to initiate the formation of a visible image in the film unit;
   support means mounted adjacent opposite sides of said housing, each of said support means including a fixed bearing for rotatably receiving an end of said first elongate roller, a movable bearing for rotatably receiving an end of said second elongate roller such that said rollers are located in juxtaposed relation with each other, and means for guiding said movable bearing toward and away from said fixed bearing so as to vary the gap between said first and second rollers;
   means for resiliently biasing said movable bearings toward said fixed bearings thereby urging said second roller toward said first roller; and
   film engaging means extending from at least one of said movable bearings and movable toward a wall of said passageway, as the film unit moves out of engagement with said first and second rollers, for cooperating with said wall to grasp the film unit by one of its ends while its opposite end extends to the exterior of said passageway.

2. Photographic apparatus as defined in claim 1 wherein said film engaging means extends from each of said movable bearings and are spaced from each other by a distance slightly less than the width of the film unit.

3. Photographic apparatus as defined in claim 1 wherein said passageway controls the initial path of travel of the film unit as it progressively emerges from the bite of said first and second rollers, said movable bearings being adapted to move said film engaging means, against the opposition of said biasing means, out of said path of travel in response to a film unit entering the bite between said first and second rollers, and to return said film engaging means, with the aid of said biasing means, to a position within said path of travel in response to the film unit moving out of engagement with said first and second rollers, whereby said film engaging means engages one surface of the film unit and cooperate with said wall of said passageway to thereby releasably retain the film unit.

4. Photographic apparatus comprising:
   a housing including means for defining a passageway leading to the exterior of said housing;
   first and second elongate rollers adapted to spread a processing liquid across a layer of an exposed film unit, as it moves therebetween, so as to initiate the formation of a visible image in the film unit;
   support means mounted adjacent opposite sides of said housing, each of said support means including a fixed bearing for rotatably receiving an end of said first elongate roller, a movable bearing for rotatably receiving an end of said second elongate roller such that said rollers are located in juxtaposed rellation with each other, and means for guiding said movable bearing toward and away from said fixed bearing so as to vary the gap between said first and second rollers;
   a pair of springs for resiliently biasing said movable bearings toward said fixed bearings to thereby decrease the gap between said first and second rollers, each of said springs including a first portion adapted to be attached to one of said support members and a second portion adapted to be attached to one of said movable bearings, said first and second portions of each of said springs being constructed to apply forces to its respective support member and movable bearing which are substantially perpendicular to the axis of said second roller; and
   film engaging means extending from at least one of said movable bearings and movable toward a wall of said passageway, as the film unit moves out of engagement with said first and second rollers, for cooperating with said wall to grasp the film unit by one of its ends while its opposite end extends to the exterior of said passageway.

5. Photographic apparatus as defined in claim 4 wherein said housing further includes means for securing said support means at opposite sides of said housing, said securing means including a groove located adjacent each of said sides for slidably receiving one of said support means, each of said grooves including an enlarged section intermediate its ends, and each of said support means further includes a rail adapted to be slidably received by one of said grooves, each of said rails including a resilient portion adapted to be cammed into alignment with one of said grooves during attachment of one of said support means to said housing thereby permitting sliding movement between said rail and said groove until said resilient portion is aligned with said enlarged section of said groove, whereupon said resilient portion moves into said enlarged section thereby locking said one support means to said housing.

6. Photographic apparatus comprising:
   a housing for a pair of elongate rollers, said housing including means for securing a support assembly at opposite sides of said housing, said securing means including a groove located adjacent each of said sides for slidably receiving a support assembly, each of said grooves including an enlarged section intermediate its ends;
   first and second elongate rollers adapted to spread a processing liquid across a layer of an exposed film unit, as it moves therebetween, so as to initiate the formation of a visible image in the film unit; and
   a support assembly located adjacent each of said sides of said housing, each of said support assemblies including means for supporting said first and second rollers for relative movement toward and away from each other and a rail adapted to be slidably received by one of said grooves, each of said rails having a width substantially equal to the width of a major length of said groove and further including a resilient portion adapted to be cammed into alignment with the remainder of said rail and with one of said grooves during sliding attachment of said support assemblies to said housing thereby permitting sliding movement between said rail and said groove until said resilient portion is aligned with said enlarged section of said groove, whereupon said resilient portion moves laterally into said enlarged section thereby locking said support assembly to said housing.

7. Photographic apparatus as defined in claim 6 wherein said resilient portion of said rail comprises a member extending from said rail in cantilever fashion and at an acute angle thereto.

8. Photographic apparatus comprising:
   a housing including means for defining a passageway leading to the exterior of said housing;
   first and second elongate rollers adapted to spread a processing liquid across a layer of an exposed film unit, as it moves therebetween, so as to initiate the formation of a visible image in the film unit;
   support means mounted adjacent opposite sides of said housing, each of said support means including a member having a fixed bearing therein for rotatably receiving an end of said first elongate roller, a movable bearing for rotatably receiving an end of said second elongate roller such that said rollers are located in juxtaposed relation with each other, and means for guiding said movable bearing toward and away from said fixed bearing so as to vary the gap between said first and second rollers;
   means for resiliently biasing said movable bearings toward said fixed bearings thereby urging said second roller toward said first roller; and
   film engaging means coupled to at least one of said movable bearings and movable toward a wall of said passageway in response to the film unit moving out of engagement with said first and second rollers so as to cooperate with said wall to grasp the film unit by one of its ends while its opposite end extends to the exterior of said passageway.

9. Photographic apparatus as defined in claim 8 wherein said biasing means comprises a pair of coil springs, each of said coil springs including opposite ends which are coupled to one of said members having said fixed bearing therein and an intermediate portion which is in engagement with one of said movable bearings.

* * * * *